Sept. 4, 1956 R. M. SNYDER 2,761,174
SECTIONAL TIRE REPAIR MOLD
Filed June 10, 1954 2 Sheets-Sheet 1

INVENTOR
Robert M. Snyder
BY
Webster & Webster
ATTYS.

Sept. 4, 1956 R. M. SNYDER 2,761,174
SECTIONAL TIRE REPAIR MOLD
Filed June 10, 1954 2 Sheets—Sheet 2
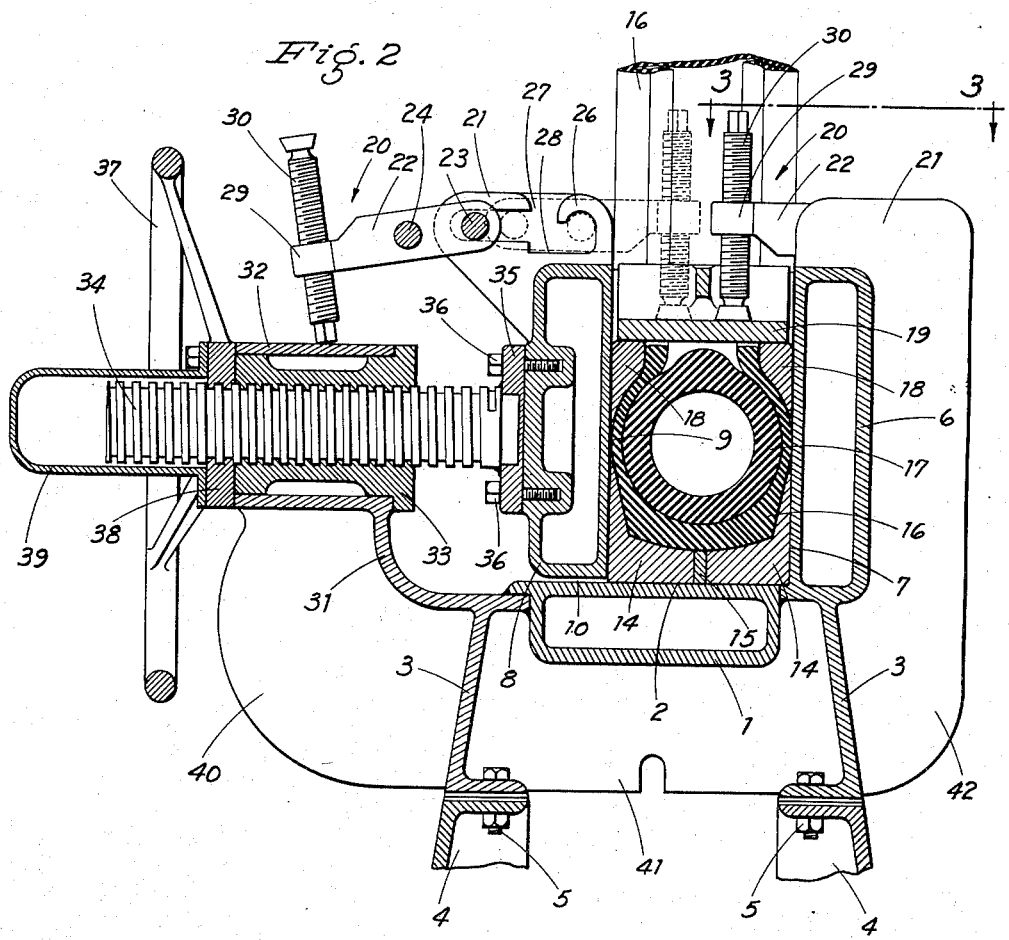
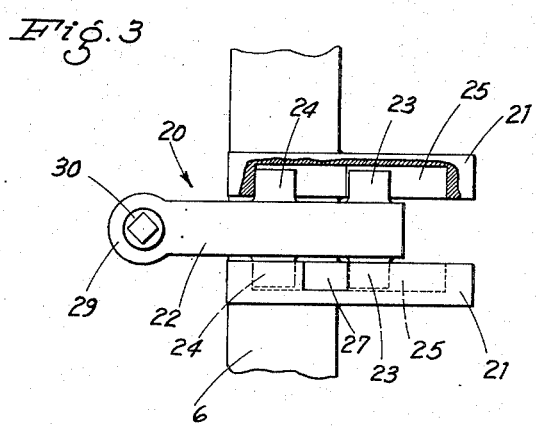
INVENTOR
Robert M. Snyder
BY
Webster & Webster
ATTYS

# United States Patent Office 2,761,174
Patented Sept. 4, 1956

2,761,174

SECTIONAL TIRE REPAIR MOLD

Robert M. Snyder, Lodi, Calif., assignor to Super Mold Corporation of California, Lodi, Calif., a corporation of California Application June 10, 1954, Serial No. 435,816

2 Claims. (Cl. 18—18)

This invention is directed to, and it is a major object to provide, an improved mold for spot or sectional repair, by vulcanization, of damaged motor vehicle tires.

Another important object of the invention is to provide a sectional tire repair mold which embodies a novel assembly of steam chambers which form the part-circle or arcuate tire receiving and vulcanizing assembly, and which assembly includes a bottom steam chamber, and—on opposite sides—a fixed steam chamber and an adjustable steam chamber; there being novel mechanism supporting the latter steam chamber for adjustment to vary the width of said cavity.

Still another object of the invention is to provide a sectional tire repair mold which includes a separate pressure plate, disposed between the side steam chambers inwardly of the portion of the tire to be repaired, adapted to maintain said portion of the tire, as well as the matrices and bead plates which embrace the same, in proper position in the vulcanizing cavity; there being novel clamping units associated with such side steam chambers and engaging the pressure plate when the mold is in use.

The clamping units are adapted to be swung between a working, inwardly projecting position overhanging the cavity and engaging the pressure plate, and a non-working, outwardly projecting position clear of the cavity, which permits the tire—and the associated matrices and bead plates—to be readily inserted in, or removed from, the mold; it being an additional object of the invention to provide each clamping unit with a novel mount which holds such unit in rigid working position, yet allows it to be quick-released manually and swung to its non-working position.

Other objects of the invention are to provide a sectional tire repair mold which is adjustable for tire size, and for clamping the assembly of matrices and bead plates about a tire to be vulcanized, by a single hand wheel; a mold which is easy to operate; a mold which is of sturdy construction; and a mold which is designed for ease and economy of manufacture.

Still another object of the invention is to provide a practical and reliable sectional tire repair mold, and one which will be exceedingly effective for the purpose for which it is designed.

These objects are accomplished by means of such structure and relative arrangement of parts as will fully appear by a perusal of the following specification and claims.

In the drawings:

Fig. 2 is a transverse sectional elevation taken on line 2—2 of Fig. 1.

Fig. 3 is a fragmentary plan view, partly broken away, taken on line 3—3 of Fig. 2; the view showing the clamping unit, in working position, which corresponds to and is mounted in connection with the stationary, side steam chamber.

Figure 1:
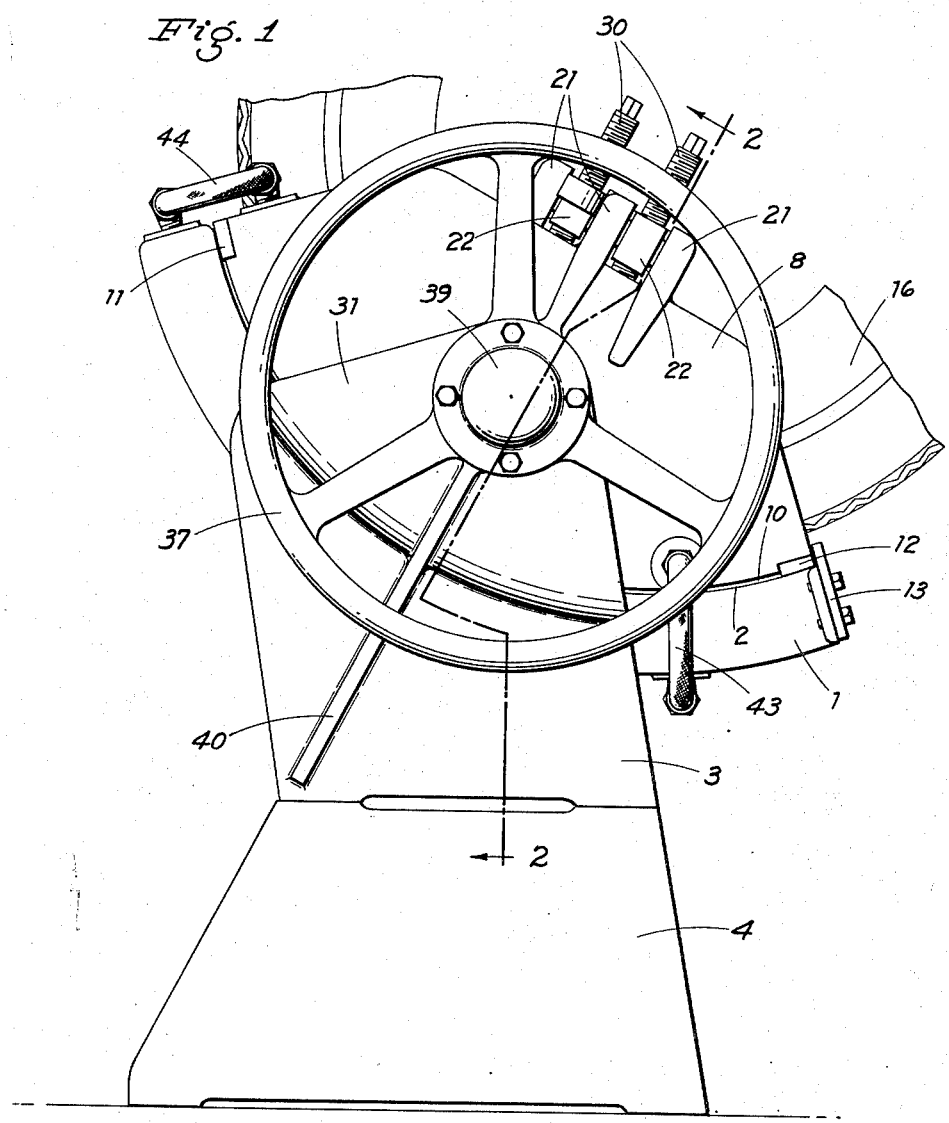
Fig. 1 is a side elevation of the sectional tire repair mold as in use, the view being taken from the side which includes the hand wheel.

Referring now more particularly to the drawings, and to the characters of reference marked thereon, the improved sectional tire repair mold comprises an arcuate, stationary, bottom steam chamber 1 having a machined inner working face 2; said steam chamber 1 being disposed so that it extends in the main at an upward and rearward incline. The bottom steam chamber 1 is supported by a base 3 which may, if greater elevation of the mold is desired above the floor, be carried on a pedestal 4; the base 2 and pedestal 4 being secured together by bolts 5.

An arcuate, stationary, side steam chamber 6 upstands at one side of the bottom steam chamber 1, and is supported in rigid relation to said chamber 1 by the base 3; the side steam chamber 6 including a machined inner working face 7.

On the opposite side the mold includes an arcuate, adjustable side steam chamber 8 disposed in spaced parallel relation to the steam chamber 6; the steam chamber 8 including a machined inner working face 9.

The edge of the arcuate, adjustable, side steam chamber 8 adjacent the bottom steam chamber 1 has matching arcuate relationship to the working face 2, but for the major portion of its length is spaced slightly therefrom, as at 10.

At opposite ends thereof the arcuate, adjustable side steam chamber 8 is fitted with shoe blocks, indicated at 11 and 12, which ride on the working face 2, whereby the side steam chamber 8 is readily slidable toward or away from the side steam chamber 6 by means of the mechanism which will hereinafter be described.

Displacement of the side steam chamber 8 forwardly ahead of the bottom steam chamber 1 is prevented by a stop plate 13 secured to the forward end of said bottom steam chamber 1 and projecting upwardly above the face 2. The stop plate 13 extends substantially full-width of the bottom steam chamber 1 so as to provide a stop not only for the side steam chamber 8, but also for the arcuate, tire receiving matrices 14 which are disposed in the cavity defined by the working faces 2, 7, and 9. An arcuate spacer bar 15 lies between the matrices to maintain the proper spacing thereof for the particular tire 16 engaged in the mold for the purpose of spot or sectional repair.

The portion of the tire 16 within the mold carries a sectional air bag 17, and arcuate bead plates 18 engage between the working faces 7 and 9 and the adjacent bead portions of the tire. The matrices 14 and the bead plates 18 all of course have matching engagement with the adjacent portions of the corresponding working faces 2, 7, or 9.

The above assembly of the matrices 14, air bag 17, bead plates 18, and the adjacent portion of the tire to be repaired are all maintained in the cavity of the mold by an arcuate pressure plate 19 disposed between the steam chambers 6 and 8, and releasably held in position by novel clamping units, each indicated generally at 20.

As the clamping units 20 are identical, except for being right and left hand—i. e. opposed—a description of one will suffice for both.

Each clamping unit 20 comprises, rigid with and atop the corresponding steam chamber 6 or 8, a pair of horizontal, transversely extending bars 21 disposed in spaced parallel relation. A relatively short arm 22 is disposed for swinging in a plane between said bars 21; such arm being swingable between a working position projecting inwardly in overhanging relation to the tire receiving and vulcanizing cavity of the mold, and a nonworking position projecting outwardly wholly clear of said cavity.

The arm 22 is formed on each side with a pair of longitudinally spaced bosses 23 and 24, and each pair of such bosses projects into a longitudinal groove 25 in the corresponding bar 21 when the arm is in working position.

Each bar 21 is formed, at the forward end of the groove 25, with a downwardly opening hook 26 which opens into said groove. Outwardly of the hook 26 each bar 21 is formed with a notch 27 which opens from the groove 25 upwardly through the top of said bar.

When the swingable arm 22 is in its working, inwardly projecting position the bosses 24 are engaged in the hooks 26, while the bosses 23 lie in the grooves 25 adjacent but short of the notch 27 as indicated in dotted lines in Fig. 2.

To swing the arm 22 from its working, inwardly projecting position the arm 22 is manipulated so that the bosses 23 are lowered slightly to escape the hooks 26, and thence said arm is pulled outwardly until said bosses 23 are in a position for upward escape through the notches 27, and at which time the bosses 24 are adjacent but short of the outer ends of the grooves 25.

The arm 22 is then swung upwardly and outwardly about the bosses 24 as an axis; the bosses 23 escaping upwardly through the notches 27. In this manner the arm 22 can be readily and easily manually released from its working position and swung outwardly to its non-working position.

The bar 21 at the bottom of the grooves 25 have a relief cut therein, as at 28, in the zone immediately adjacent the hooks 26 and notches 27, in order to permit the bosses 24 to be shifted downwardly and thence outwardly for escape from said hooks 26 and through the notches 27, as above described.

The arm 22 is formed, at its free end, with a head 29 through which a clamping screw 30 is threaded at a right angle to said arm. When the arm is in its working, inwardly projecting position the clamping screw 30 is run downwardly, whereby to impart a substantial force against the pressure plate 19. The arms 22 of the respective clamping units 20 are offset from front to rear of the mold as shown in Fig. 1 in order that such units may each be readily manipulated without interference by the other.

The side steam chamber 8 is adjustable in or out as follows:

A bracket 31 is formed integral with the base 3 and extends outwardly and upwardly beyond said chamber, and at its upper end such bracket carries a bearing sleeve 32 whose axis extends horizontally, and transversely of the mold.

An elongated nut 33 is mounted in rotatable but axially immovable relation in the sleeve 3, and a heavy-duty screw 34 is threaded through such nut. At its inner end the screw 34 is fixed to an attachment disc 35 connected by cap screws 36 to the steam chamber 8 substantially centrally thereof.

A hand wheel 37 surrounds the outer end portion of the screw 34, and said wheel includes a hub 38 fixed to the adjacent end of the nut 33. The hub 38 carries a protective cap 39 which encloses the outer end portion of the screw 34.

By rotating the hand wheel 37 in one direction or the other, which in turn rotates the nut 33, the screw 34 is caused to move axially inwardly or outwardly to accomplish the adjustment of the steam chamber 8. Such adjustment is for the initial setting of the steam chamber 8 in proper relation to the steam chamber 6 for a particular size of tire, and is therefore useful to clamp the assembly of the matrices 14 and other related parts between the steam chambers 8 and 6.

The assembly of the fixed parts of the mold are strengthened by certain reinforcing ribs disposed in a transverse vertical plane; one rib 40 connecting the base 3, bracket 31, and bearing sleeve 32; another rib 41, within the base 3, connecting with the bottom steam chamber 1; and a further rib 42 connecting the base 3 and the steam chamber 6, the latter rib merging in integral relation with the corresponding one of the bars 21 of the related clamping unit 20.

The steam chambers 1, 6, and 8 are supplied with steam by means of a suitable conduit system, which system is here omitted for the purpose of clarity, except for the showing of flexible hoses 43 and 44 which connect between the steam chambers 1 and 8 at opposite ends thereof. By reason of the flexibility of the hoses 43 and 44 the steam chamber 8 can be adjusted in the manner described.

With the described mold, spot or sectional repairs can be accomplished effectively, readily, and easily on a tire; the clamping units 20, and the manner of adjustably mounting the steam chamber 8, being especially valuable features of the invention.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. In a sectional tire repair mold which includes side and bottom members arranged to define an arcurate segmental vulcanizing cavity open at the top and ends and arranged to receive an arcuate portion of a tire, and a pressure plate disposed in the cavity to engage a tire opposite the bottom member; means supported from the mold to releasably engage the pressure plate to force the same down, said means comprising an arm arranged to extend transversely over the cavity and pressure plate, a screw mounted in the arm adjacent one end thereof, and mounting means for the arm comprising a bar extending laterally out from one side member adjacent and parallel to the arm, said bar having a substantially horizontal elongated closed-end slot in the face thereof nearest the arm and an opening to the top of the bar from the slot intermediate the ends thereof, and a pair of longitudinally spaced bosses on the arm slidable along and turnable in the slot, said bosses being arranged relative to the slot and the opening therefrom so that when the arm is moved to a working position the boss nearest the screw will be adjacent the end of the slot closest to the cavity and the other boss will then be beyond the opening but clear of the outer end of the slot a sufficient distance to enable the arm to be slid in a direction laterally out from the mold cavity until the first named boss is alined with said opening; the latter having sufficient width to receive said first named boss therethrough whereby the arm may be then swung up, to a non-working position clear of the cavity, about the other boss as an axis.

2. A device, as in claim 1, in which the upper face of the slot at the end thereof nearest the cavity is formed as a downwardly opening hook to receive the first named boss in seated relation and prevent sliding movement of the arm laterally out when the screw is advanced into pressing engagement with the pressure plate.

References Cited in the file of this patent

UNITED STATES PATENTS

| | | |
|---|---|---|
| 1,321,961 | Wheelock | Nov. 18, 1919 |
| 1,445,428 | Williford | Feb. 13, 1923 |
| 2,025,664 | Taylor | Dec. 24, 1935 |
| 2,391,300 | Dettling | Dec. 18, 1945 |
| 2,399,937 | Norcross | May 7, 1946 |
| 2,566,797 | Heintz | Sept. 4, 1951 |
| 2,584,173 | Van Fowler | Feb. 5, 1952 |